United States Patent
Nelson (10) Patent No.: US 7,132,943 B2
(45) Date of Patent: Nov. 7, 2006

(54) MOVING BELT SENSOR

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 129 days.

(21) Appl. No.: 10/532,158

(22) PCT Filed: Oct. 28, 2003

(86) PCT No.: PCT/US03/34186

§ 371 (c)(1),
(2), (4) Date: Apr. 20, 2005

(87) PCT Pub. No.: WO2004/044594

PCT Pub. Date: May 27, 2004

(65) Prior Publication Data

US 2005/0270154 A1     Dec. 8, 2005

Related U.S. Application Data

(60) Provisional application No. 60/424,606, filed on Nov. 7, 2002.

(51) Int. Cl.
*G08B 13/24* (2006.01)

(52) U.S. Cl. ............... 340/551; 340/552; 340/567; 340/673; 340/676; 340/686.6; 324/233; 324/326; 324/329

(58) Field of Classification Search ............ 340/551, 340/552, 567, 676, 673, 686.6; 324/326, 324/329, 233
See application file for complete search history.

(56) References Cited

U.S. PATENT DOCUMENTS

| | | | |
|---|---|---|---|
| 3,899,071 A | 8/1975 | Duffy | |
| 4,854,446 A | 8/1989 | Strader | |
| 5,712,441 A | 1/1998 | Grunewald | |
| 5,869,967 A | 2/1999 | Straus | |
| 5,892,360 A | 4/1999 | Willer et al. | |
| 6,026,135 A | 2/2000 | McFee et al. | |
| 6,032,787 A | 3/2000 | Kellis | |
| 6,097,190 A | 8/2000 | Foerster | |
| 6,333,631 B1 | 12/2001 | Das et al. | |
| 6,525,539 B1 | 2/2003 | Birken et al. | |
| 6,581,755 B1 * | 6/2003 | Wilke et al. | 198/810.03 |
| 6,715,602 B1 * | 4/2004 | Gartland | 198/810.02 |

OTHER PUBLICATIONS

PCT International Search Report, International Application No. PCT/US03/34186, mailed Jun. 22, 2004.

* cited by examiner

*Primary Examiner*—Tai Nguyen
(74) *Attorney, Agent, or Firm*—Albert J. Fasulo, II (57) ABSTRACT

A detection system is provided which is configured to have a transmitter capable of interacting with an object by generating a field, and a multiplicity of receivers operative to measure changes in the environment caused by the object's response to the generated field and mounted to a closed-looped belt, which is displaceable in a proximity to the object.

27 Claims, 5 Drawing Sheets

MOVING BELT SENSOR

CROSS-REFERENCE TO RELATED APPLICATIONS

This application is a 371 of PCT/US03/34186 filed on Oct. 28, 2003 which claims the benefit of U.S. Provisional Application No. 60/424,606 filed Nov. 7, 2002, the contents of which are incorporated herein by reference.

STATEMENT OF GOVERNMENTAL INTEREST

This invention was made with Government support under contract no. DAAB15-00-C-1008, task no. SMBA1 awarded by the Army. The Government has certain rights in this invention.

BACKGROUND OF THE INVENTION

1. Field of the Invention

The present invention generally relates to an object detection system coupled to and displaceable with a closed-loop belt.

2. Description of the Related Art

Landmines, airport luggage conveyor belts and food processing plant conveyor belts all have a need for detection of metal objects in a fast and efficient manner. In addition to detection of metal, these metal detectors sometimes must classify or discriminate the type of metal from clutter objects. This is particularly important for landmine detection to reject the potentially high incidence of metal clutter in the environment.

Figure 1:
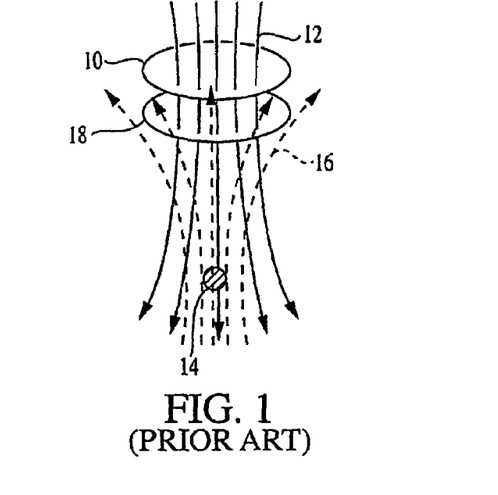
FIG. 1 is a schematic representation of the principle of operation of a metal detector.

As shown in FIG. 1, the operation of metal detectors is based upon the principles of electromagnetic induction. Usually, a metal detector includes one or more transmitting coils or transmitters 10 carrying a time varying electric current generating a corresponding time-varying magnetic field 12, which propagates towards a metallic target 14. This primary or incident field produces eddy currents in the metallic target 14 generating, in turn, a secondary magnetic field 16, which is directed oppositely to the primary field and received by an antenna receiving coil or receiver 18, where it induces a detectable electrical voltage.

Metal detectors are proximity sensors having a region of sensitivity that is directly related to the size of the transmitter and receiver coils. Basically, the metal detector is sensitive to metal only near the receiving coil and is characterized by a time constant necessary for the metal detector to integrate or process the detected signal so as to discriminate metal from the background. The time constant is relatively fast when a human is walking and searching for metal objects such as, for example, landmines. However, in a variety of applications associated with the metal detector, this time constant is not adequate, particularly, in the context of military applications or relatively fast moving transporting belts. In a number of references, the U.S. Army has stated that a vehicle equipped with a metal detector must travel up to 10 m/sec or, approximately, 20 miles per hour (MPH) during landmine detection, which is substantially higher than the speed of a walking person. Assuming, for example, that a typical metal detector has a 0.2 m long metal detection region and a time constant of 0.2 sec, a speed of advancement of the vehicle equipped with this detector would be S=0.2 m/0.2 sec=1 m/s, which is not nearly sufficient to meet the U.S. Army guidelines.

To increase the efficiency of the detection, numerous designs of the vehicle-mounted metal detectors have been implemented. For example, U.S. Pat. No. 6,026,135 discloses a linear array of metal detectors fixed to a vehicle along a line perpendicular to the direction of travel. Similarly, U.S. Pat. No. 5,892,360 discloses an array of metal detectors fixed to a vehicle. These references only increase the metal detection area of coverage capabilities across the direction of motion (sweep area) and do not increase the detection capability in direction of motion.

In addition to detection of metal targets, it is necessary that these targets be discriminated from surrounding debris or metal clutter. To accomplish it, the metal detector must dwell over a metal target longer than the time needed to detect such a target. This is necessary because the signal identifying the target must be on the order of at least 10 times the noise for proper discrimination algorithms to work effectively. Accordingly, extra time is needed to integrate or process the signal and reduce the noise. For example, the time required for detection of small plastic landmines may be as long as 0.5 to 23 seconds, depending of the type of metal detector, type of metal, type of soil and the depth of the metal target Increasing the efficiency of detection of metal targets is not limited to military and humanitarian demining. A variety of industrial processes including, for example, food and chemical processing, utilize conveyors for transporting material that has to be separated from metal targets. Conventionally, as diagrammatically illustrated in FIG. 2A, a plurality of linearly arranged metal detectors 20 are fixed to a stationary support 22 to detect metal object(s) 24 transported on a moving conveyor 26. Displacing the metal object 24 past by an array of the operating metal detectors 20 causes each detector to generate a respective output voltage signal V as long as the metal object 24 is within the field-of-view (FOV) of the receiver or antenna of the metal detector 20. Thus, the length of time T during the output voltage signal can be generated is determined by the size of the antenna, which is the combination of a metal detector's transmitter and receiver, of each metal detector 20 and the speed of the conveyor belt 26. The response time of the metal detector is governed by many parameters including, among others, magnetic field strength of the transmitter, duty cycle and timing of the transmitter, sensitivity of the receiver and the response time of the electronics configured to detect small metal signals in background noise. The response time of the electronics is characterized by the necessary signal averaging time, which is particularly important since all metal detectors must perform some type of signal processing, especially for small targets that may have signals buried in electronic noise.

Figure 2A:
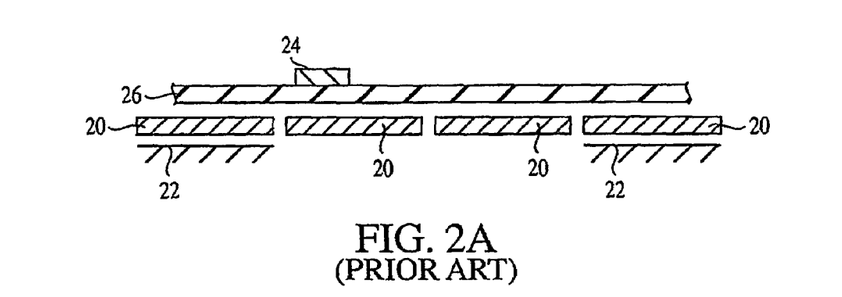
FIG. 2A is a diagrammatic view of a prior art detection system.

The important point is all detectors 20 have a fixed response time. Typical response times are less than 1 second. Accordingly, for example, as long as the speed of the conveyor belt moves the object past the metal detector within its response time, metal objects will be detected reliably. As the speed increases, the fixed response time negatively influences the detection sensitivity and reliability. If very small metal objects are to be reliably detected, the response time needs to be increased to allow, for example, more signal averaging to reject background noise. In other words, the field of view (FOV) of the metal detector 20 must match the response time and sensitivity requirements of the metal detector. However, a typical response time of the detector(s) 20, mounted stationary relative to the conveyor belt 26, is low by comparison to the speed of this belt. As a consequence, while the metal detection technology is well developed and highly sensitive, its relatively long response time controls and, thus, limits the rate at which the detection can be performed.

Figure 2B:
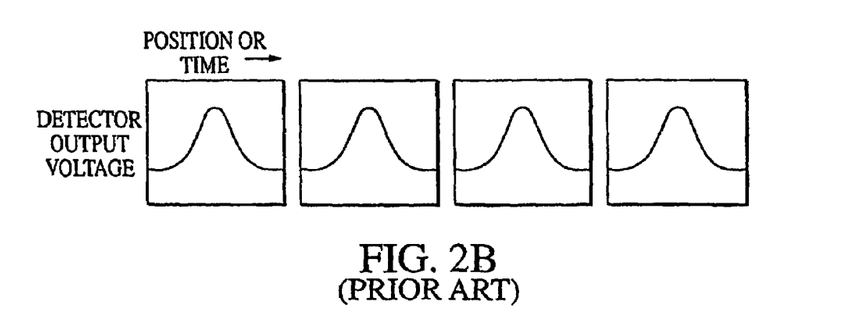
FIG. 2B illustrates a graph of an output voltage over time/position of the metal detection system of FIG. 2A.

Also, the discrimination of the metal object(s) 24 in the system having stationary metal detectors 20 may not be efficient since, as discussed above, the metal detector 20 does not have sufficient "dwell time" near the object 24 under study to enable the electronics to classify this object. As can be seen from FIG. 2B, a diagram of the typical metal detector output voltage versus position (or time in the case of an object moving across the array from left to right), the spatial/time variability of the output complicates any signal processing scheme that is trying to average the output of the spatial varying signal compared to a stationary output with good dwell time over the target. Particularly, a dwell or exposure time td, during which the metal object to be detected is within the field of view (FOV) of a respective detector, is relatively short. However, increasing the dwell time of the fixed detector(s) 20 may be a difficult task to accomplish, as the position of the object may be unknown. Using multiple fixed metal detectors does not provide for the sensitivity enhancing aspects of ensemble signal averaging that is possible in a single metal detector processing scheme.

A need therefore exists in a system for the detection of metal objects configured to provide reliable detection and classification of even relatively small metal targets at a relatively high speed of detection.

SUMMARY OF THE INVENTION

In accordance with the present invention, a detection system is provided and is configured to have a transmitter capable of inductively interacting with a hidden object, and a multiplicity of field receivers or detectors responsive to a change in a field, which is generated by the transmitter, and mounted to a belt displaceable in a proximity to the hidden object.

In accordance with one aspect of the invention, the detection system of the present invention is based on the electromagnetic principles, whereas another aspect of the system of the present invention is concerned with the detection system being based on the acoustic principles. Common to both implementations of the systems of the present invention are time requirements for dwelling by a sensor over a hidden object or target to extract detection or classification information.

Accordingly, one embodiment of the present invention is a detection system comprising an array of linearly positioned detectors installed in a closed loop track of a moving vehicle. One of the advantages of such a configuration is that the speed of the vehicle is not governed by the detector response time, but depends primarily on the size of the detector array. A further advantage of the detection system of the present invention relates to the improved efficiency of the system thereby meeting the mission requirements imposed by, for example, the U.S. Army. Yet another advantage of the detection system of the present invention is that a metal or acoustic detector is juxtaposed with a hidden object for a relatively long dwell time, which leads to more reliable classification of the detected objects. Yet another advantage is that a more precise position of the hidden object is determined and not distorted due to the time constant of the detector.

Another embodiment of the present invention comprises incorporation of the detection system in a conveying assembly transporting material to be free from foreign objects. Similarly to the demining application of the inventive system, a series of detectors is coupled to a closed-loop conveyor located adjacent to the conveying assembly. Such a configuration allows any given detector to dwell over a hidden object for a longer dwell time without, however, imposing speed limitations upon the conveying assembly, which, otherwise, would be necessary due to a relatively short response time of detectors.

BRIEF DESCRIPTION OF THE DRAWINGS

The above and other features, advantages and objects of the invention will become more readily apparent from the description of the preferred embodiments accompanied by the following drawings, in which.

DETAILED DESCRIPTION OF THE PREFERRED EMBODIMENTS

Figure 3:
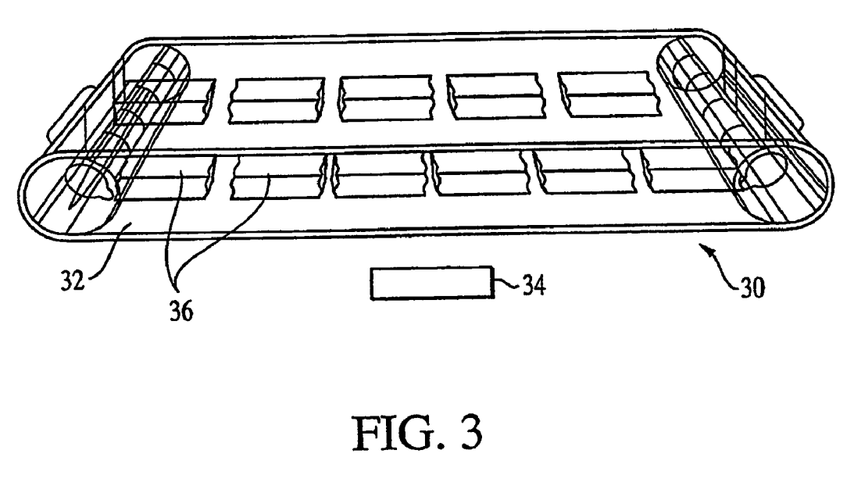
FIG. 3 is a perspective view of the inventive detection system configured in accordance with one embodiment, in which a plurality of detectors are coupled to a closed-loop track of a vehicle typically used for demining operations.
Figure 4:
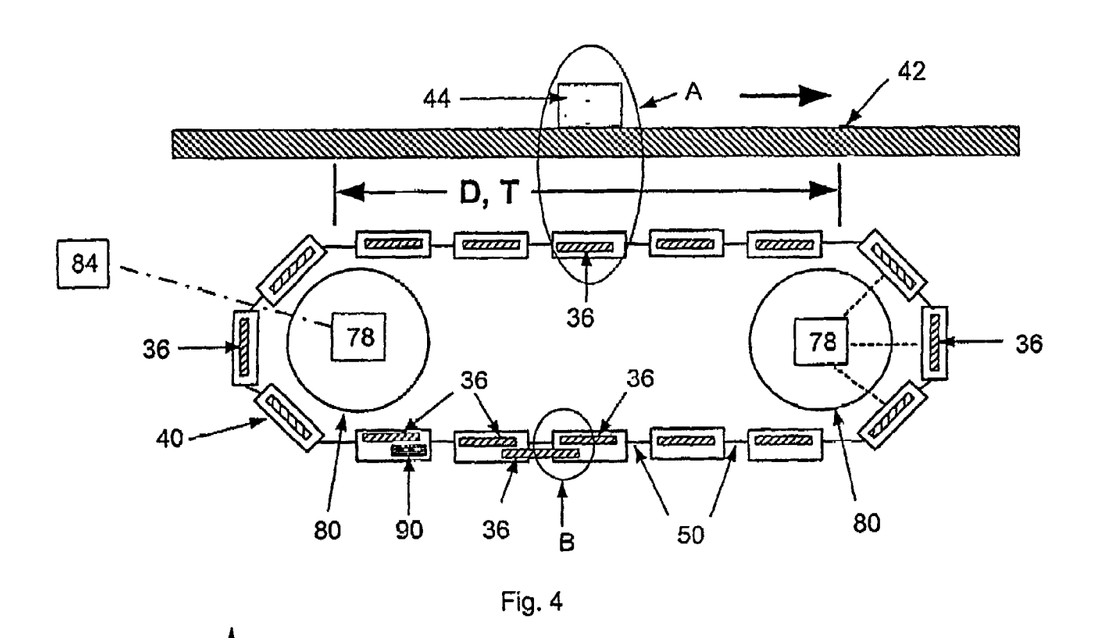
FIG. 4 is a side view of the inventive system configured in accordance with another embodiment of the invention and having an array of metal detectors totally incorporated in closed-loop belt which runs adjacent to a material conveying conveyor.

Referring to FIGS. 3 and 4, a metal detection system 30 is configured to detect and discriminate metal objects while being carried by a closed-loop conveyor, which may be, for example, a track 32 of a vehicle (FIG. 3) or a detector carrying belt 40 (FIG. 4). Regardless of the configuration of the detection system of the present invention, at least the receivers thereof are movably fixed to the closed-loop belt leading, thus, to the increased dwell time, during which an object 34 to be detected remains in the field of view of the metal detectors. Increasing the dwell time of the detection system for example improves the discrimination of metal objects due to a longer signal averaging time allowing for the use of the conventional metal detection system, which has a low time response approximating one second, with relatively high speed vehicles or object carrying conveyors.

Referring to FIG. 3, in accordance with the system of the present invention, an array of metal detectors 36 is embedded in series in the closed-loop track 32 and moves therewith relative to a vehicle and to a metal object, such as a landmine 34. The vehicle may be, for example, a tank, robot, or any other vehicle designed to detect underground metal objects and particularly advantageous for landmine detection. To take advantage of the speed of the vehicle provided with a metal detection system, it is necessary that the latter would be characterized by a high sweep rate, which is one of the most important operational requirements for landmine detection. Embedding a plurality of metal detectors 36 in the track 32 allows any given metal detector to be juxtaposed with and, thus, dwell over the landmine for the desired dwell time, which is a function of detector's length, not its response time.

The detection system of the present invention is not limited to metal detectors. As one skilled in the art would readily appreciate, any sensor that has similar time requirements for dwelling over a hidden target to extract detection or classification information thereof can be used instead of the metal detector. For example, in the context of demining, an acoustic landmine detector have similar dwell time requirements and, thus, can be successfully utilized either alternatively to the metal detector system or in combination therewith.

The acoustic detection system of the present invention may have a variety of configurations. An example of one such system includes at least an acoustic transmitter (e.g., loudspeaker) that excites a patch of ground where a landmine is possibly buried. Buried land mines have different acoustic properties than the surrounding soil and may be characterized by a unique set of resonances or acoustic "signatures" generated in response to an applied acoustic signal. When a laser Doppler system, which measures the micro-vibrations of the ground, is scanned across the ground, the ground over the landmine has a different motion than the surrounding soil, thus revealing the fact that something is buried at that location. Based on the detected acoustic response, determination as to the nature of the detected target can be made. The acoustic excitation is analogous to the magnetic field excitation transmitter of the metal detection system described previously, and the laser Doppler vibration detection system is analogous to the magnetic field receiver. In contrast to the metal detection system, the acoustic detection system requires time for the laser to scan the ground and average the return signals to detect ground vibrations.

Thus, although the following description is associated mainly with the metal detector, each and every feature, as disclosed above and below, equally relates to any other sensor characterized by dwell time characteristics.

Figure 4A:
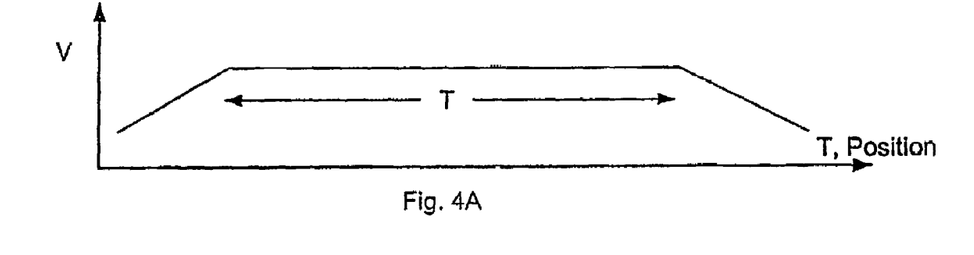
FIG. 4A is a diagram of output voltage versus time/position graph of the inventive metal detection system.

A further embodiment of the invention is illustrated in FIG. 4 and may be advantageously utilized for detecting undesirable metal object(s) 44 in material transported by a conveyor 42. As shown in FIG. 4, the closed-loop detector-carrying belt 40, positioned in the vicinity of the conveyor 42, is configured to have an array of metal detectors 36 capable of detecting metal object(s) 44 carried by the conveyor 42. A substantially parallel position of at least one of the forward and return straight stretches of the belt 40 and the conveyor 42 allows a respective metal detector located in the vicinity of the object 44, as indicated by arrow A, to travel substantially synchronously along the length D of the linear stretch during a relatively long time T. In other words, the material and the metal detector conveyors move at the same speed so that the two are synchronized in motion. Consequently, a dwell time, during which the object 44 is within the FOV of the adjacent metal detector, is substantially greater than the time of exposure of the object in case of the fixed metal detector of FIG. 2. Thus, the object 44 will be in a fixed reference frame with respect to the opposing metal detector 36 during a dwell time period T dependent on the length D of the straight stretch of the belt 40. In other words, the object 44 and the opposing metal detector 36, for example, depicted in region A, are stationary with respect to each other and interact with each other as long as they move along the length D. The criticality of the system of the present invention can be seen in FIG. 4A illustrating an output voltage signal V, which is generated by a respective metal detector juxtaposed with the metal object 44, for the dwell time T greater than the prior art system of FIG. 2A. The output voltage signal V is relatively constant and thus simplifying and improving the accuracy of signal processing metal detection and classification algorithms.

The dwell time T of the metal detection process can be adjusted to the desired sensitivity requirements of the metal detector by adjusting the length of the belt 40. If, for example, the metal detector that is used in the embodiment shown in FIG. 4 requires 1 second to detect and/or classify the presence of metal object, and the speed of the conveyor belt is 1 m/s, then the length D should be 1 m. Accordingly, system 30 can be flexible and can be adjusted to meet the local requirements by selecting the detector's sensitivity parameters, the belt size and detection speed.

The closed loop belt 40 may be configured as a continuous belt made of flexible material incorporating the metal detectors or be constructed as a linked-track belt including a plurality of separate interconnected links 50, each provided with a respective metal detector. By comparison with a continuous belt, the belt link configuration is somewhat advantageous since; a maintenance process of individual links as well as of individual metal detector parts is more time and labor efficient.

While the metal detector invariably has a transmitter and a receiver, cumulatively defining the detector's antenna, it may operate in a time domain (TD) or frequency domain (FD) mode. Time domain, or "pulse", instruments work by passing pulses of current through a transmitter coil. Magnetic field sensor measures the magnetic field caused by the eddy currents from a nearby metal target. Frequency domain metal detectors typically use separate transit/receive circuits and operate in a range between a few kHz and a few tens of kHz. Due to the mutual inductance between the transmitting and receiving coils, any change in the voltage in the receiving coil caused by the presence of a metallic object can be interpreted as a change in the mutual inductance.

Figure 5A:
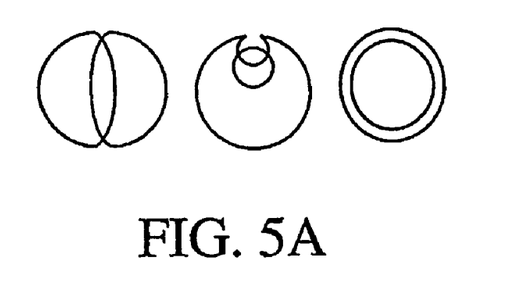
FIGS. 5A, 5B and 5C are views of different coil configurations.
Figure 5B:
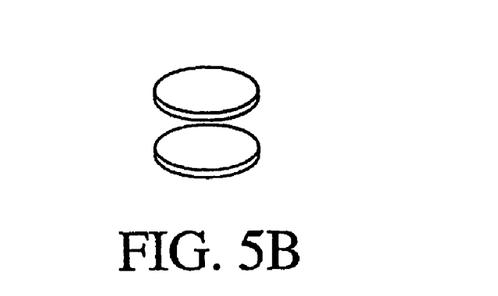
Figure 5C:
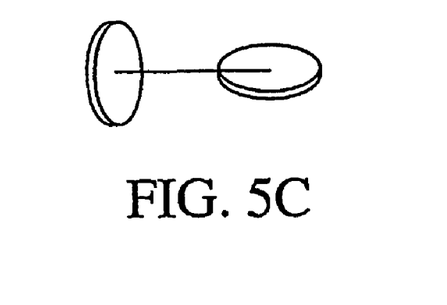

While different types of the metal detectors are known in the art and can be successfully used in the context of the invention, e.g., magneto-resistors, flux gate, etc., a conventional loop antenna that uses induction for detection of metal target eddy currents is the most popular type. Modifications of the coil configurations are numerous and include, among others, either a single coil acting both as a transmitting and receiving coil or multiple coils, which can be positioned coplanar (FIG. 5A), coaxially (FIG. 5B) or orthogonally (FIG. 5C). It is to be understood that the adjacent receivers can overlap one another so as to have 100% metal detection sensitivity or coverage, as diagrammatically indicated by arrow B in FIG. 4. Furthermore, an array of detectors 36 may include electromagnetic detectors, such as metal detectors, and acoustic detectors forming any desirable sequence. For example, the metal and acoustic detectors 36 may alternate along the belt 40 or patterned in-groups, each of which may have a plurality of consecutive sensors operating on the same principle.

Figure 6:
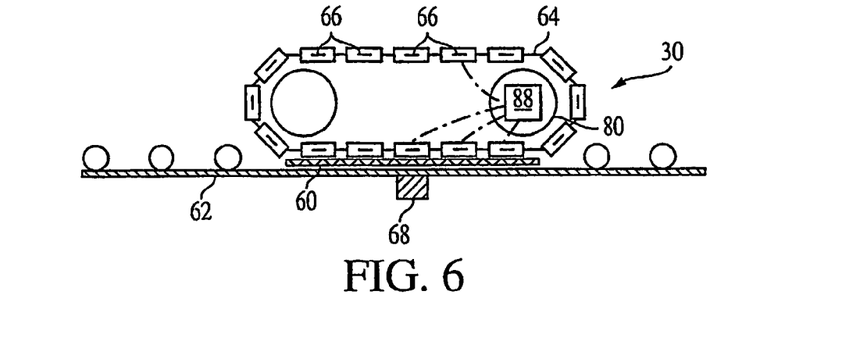
FIG. 6 is a diagrammatic view of the inventive system configured in accordance with another embodiment of the invention, in which a transmitter is fixed relative to a closed-loop belt with an array of receivers incorporated therein.

Referring to FIG. 6, the metal detector system 30 is configured with a fixed transmitter 60 spaced from a detector carrying belt 64 so as to create a relatively uniform excitation magnetic field over the belt's length. Typically, the transmitter has a multiple turn wire loop-carrying current in either a time domain pulse induction or frequency domain design, however, the transmitter can be provided with a single turn loop as well. A conveyor 62 transports material in the proximity of the belt 64, which has either a plurality of interconnected links, as shown, or is structured to have a one-piece belt. In either case, a series of receiving antennas or magnetic field receivers 66 is embedded in the belt 64. Similarly to the embodiment shown in FIG. 4, the speed of the belt 64 is substantially synchronized with the conveyor 62 carrying, among others, metal object(s) 68. Accordingly, as the belt 64 and the conveyor 62 move substantially synchronously, the object 68 can be in a fixed reference frame with respect to any given receiver 66 for the length of time dependent on the length of the straight stretch of the belt 64. As a consequence, the object 68 and the receiver 66 juxtaposed with this object are stationary with respect to each other. Thus, the dwell time of the metal detection process is substantially greater than the dwell time of the known systems and can be adjusted to the desired sensitivity requirements of the metal detector by adjusting the length of the belt 62 without, however, increasing the response time of the detectors.

Figure 7:
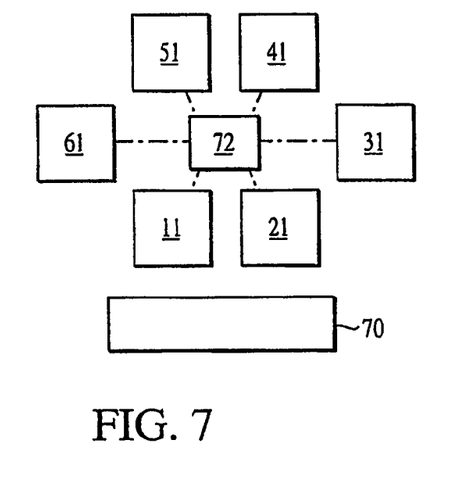
FIG. 7 is a diagrammatic view of the inventive system illustrating the embodiment shown in FIG. 4; and, FIG. 8 is a diagrammatic view of the embodiment of the inventive system shown in FIG. 6.

FIG. 7 illustrates a simplified block diagram of the embodiments of FIGS. 3 and 4 configured to have a circular array of self contained metal detectors, i.e., metal detectors the transmitting and receiving coils of which are embedded in the detector-carrying belt (not shown). For illustrative purposes, six metal detectors 11, 21, 31, 41, 51 and 61 are arranged in a circular array. Metal detectors 11 and 21, directly juxtaposed with a detecting region 70, operate so as to detect metal objects within this region, while the rest of detectors 31, 41, 51 and 61 are turned off as long as they are displaced along the return path of the moving belt.

While not necessary, it is preferred to energize the metal detectors selectively in order to minimize interference between the detectors positioned closest to the region under study and those located remotely therefrom. Furthermore, metal detectors, such as 11 and 21, located adjacent to the detecting region operate in a time multiplexed manner that can be implemented by a variety of timing methods each configured to prevent interference between these detectors. For example, metal detectors 11 and 21, if operated in a time-domain mode, can be controlled so that initially, the metal detector 11 would charge and fire (turn-off) its transmitter coil while the receiving coils of both detectors 11 and 21 listen for the metal target signal. Then, in accordance with a signal generated by a controller 72, which has software operative to coordinate the operation of the metal detectors, the metal detector 21 could charge and fire its transmitter coil while the receiving coils of the detectors 11 and 21 listen for the metal target signal.

In case of frequency domain mode metal detectors, adjacent detectors 11 and 21 could operate at different frequencies (transmitter coils would be tuned to different frequencies) so as to not interfere with each other. Accordingly, all six of the metal detectors shown in FIG. 7 would operate at different frequencies. For example, using narrow band filters or synchronization detection techniques known in the art, there would be minimal crosstalk between the different metal detectors.

The system 30, as utilized in the embodiment of FIG. 3, is configured not only to detect and discriminate objects, but also it is configured to define a depth at which the detected metal object is locate under a surface. To realize the depth determination, the receiving coils, but not transmitters, are enabled to operate on the return path of the detector-carrying belt 64. It is well known in the art that a vertically spaced pair of receiver coils can determine depth at which a metal object is buried. Even though the upper receiver coils of the detectors 41 and 51, are moving, given an adequate signal to noise (SNR) output, the signal from the moving receivers can be used to estimate metal target depth. As shown in FIG. 7, detectors 41 and 51 would be used to obtain a signal for depth estimation when they are directly over the detectors 11 and 21, respectively. The control device 72 can collect the necessary data at the proper time during the motion of the belt.

Figure 8:
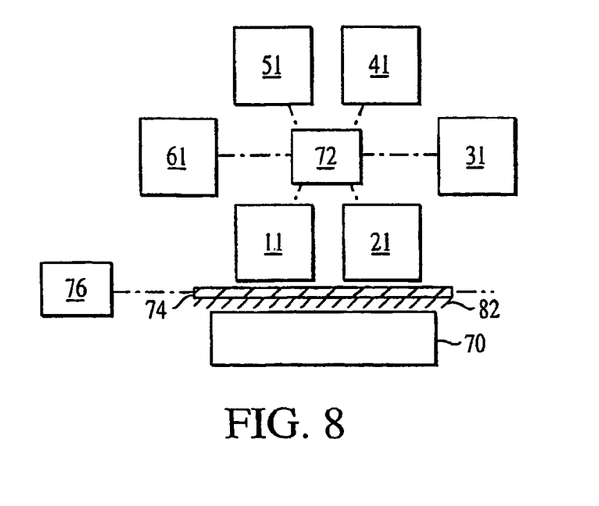

The diagram of FIG. 8 illustrates the embodiment of FIG. 6 and is similar in operation to the one of FIG. 7. However, in contrast to the diagram illustrated in FIG. 7, the transmitter 74 is provided on a reference frame 82, which is stationary relative to the receiving coils travelling along with the detector carrying belt, not shown in this figure.

Thus, the criticality of detection system 30 includes the increased dwell time during which a metal object may be exposed to the magnetic field emanated from the metal detector without modifying the fixed response time thereof. The increased dwell time allows time for the control system 72 (FIG. 7) to adjust various parameters including, but not limited to excitation duty cycle, power levels for non-signal saturation, etc for optimized detection and classification purposes. For example, the metal detector would normally be set for maximum sensitivity in the search for low-metal content landmines, but there are also landmines that have larger metal content that must be discriminated against clutter also. Accordingly, the high sensitivity setting of the detector will saturate the output of the detector that is feeding the control system 72 unless the metal detector can adjust itself for optimal performance based on the signal of the detected metal. From a structural design standpoint, based on the desired sensitivity parameters, the belt size and detection speed can be either increased or decreased.

As is known, the most power intensive part of a metal detector is the transmitter. Typically, greater than 90% of the power consumed by the metal detector is used by the transmitter to induce detectable signals in the nearby metal objects (e.g., induce eddy currents). In accordance with one aspect of the invention, it is particularly advantageous if used with the embodiments better illustrated in FIGS. 6 and 8, the transmitter 74 mounted to the stationary reference frame 82 is powered from a conventional fixed (non-moving) power source(s) 76. The use of the separately positioned power source 76 reduces belt weight and removes the need for recharging the batteries. To transmit power from the power source 76 to the metal detectors, which are embedded in the detector-carrying belt, the detection system 30 may use a conventional commutation (i.e., slip ring) system 78. As diagrammatically shown in FIG. 4, the commutation system 78 is coupled to a belt support wheel(s) or drum(s) 80. Optionally, the commutation system 78 can be coupled to the embedded detectors so as to transfer a metal detected signal to an alarm system 84 typically generating a sound signal in response to the detected metal signal. Alternatively to the commutation system, a wireless system 88 configured to transmit the detected data can be mounted in the belt support wheel 80, as diagrammatically shown in FIG. 6.

Alternatively, since the receiver electronics consume very little power, a small battery 90 (FIG. 4) could be embedded into the continuous moving belt or link-type belt 40 to supply energy sufficient to operate the detection system 30. Based on the physics of the metal detection phenomenon, the small batteries 90 can be charged by the AC field, which is generated by each energized metal detector. As a result, the detection system 30 may be used without a commutation system and thus have a relatively simple structure and be more cost efficient. Furthermore, an induction charging system (known in the art) could be used to continually or selectively recharge the batteries.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. A system for detecting a metal object comprising:
    a closed-loop belt displaceable in proximity to the metal object; and
    a first metal detector, comprising:
        a transmitter, embedded in the closed-loop belt to move therewith, operative to generate a time-varying magnetic field for inductively coupling the transmitter and the metal object; and
        a receiver, embedded in the closed-loop belt to move therewith, operative to measure eddy currents induced in the metal object by the time-varying magnetic field.

2. The system of claim 1, further comprising at least one second receiver embedded in the closed loop belt at a distance from the receiver of the first metal detector.

3. The system of claim 2, further comprising at least one second transmitter inductively coupled to the at least one second receiver to constitute at least one second metal detector.

4. The system of claim 3, wherein the transmitters of the first and at least one second metal detectors, respectively, are spaced from one another.

5. The system of claim 3, wherein the transmitters of the first and at least one second metal detectors, respectively, overlap one another.

6. The system of claim 3, wherein the closed loop belt is a track mounted on a vehicle displaceable relative to the at least one object so that a dwell time during which the object remains in a field of view of at least one of the first and at least one second metal detectors is independent from a response time thereof and depends on a length of the receiver, and a length of a linear stretch of the track.

7. The system of claim 3, further comprising a conveyor transporting material to be separated from the object and juxtaposed with at least one of forward and return linear stretches of the closed loop belt so that at least one of the first and at least one second metal detectors is juxtaposed with and travels substantially synchronously with the object over a length of the at least one of forward and return linear stretches to increase a dwell time during which the object remains in a field of view of the juxtaposed one of the first and at least one second metal detectors.

8. The system of claim 3, further comprising a power source coupled to the first and at least one second metal detectors and a controller coupled thereto and to the power source, the controller being operative to selectively energize the first and at least one second metal detectors to minimize interference between the first and at least one second metal detectors.

9. The system of claim 8, wherein the power source includes at least one battery embedded in the closed-loop belt to supply energy sufficient to operate the first and at least one second metal detectors.

10. The system of claim 9, further comprising a second battery embedded in the closed-loop belt, and an induction battery charging system operative to charge the at least one and second batteries simultaneously or selectively.

11. The system of claim 8, further comprising a wireless inductive system operative to couple the first and at least one second metal detectors to the power source and located in at least one of a plurality of drums rotatably supporting the closed loop belt.

12. The system of claim 8, wherein the controller is operative to adjust a parameter selected from the group consisting of an excitation duty cycle, signal acquisition system sample rate, power levels for non-signal saturation, metal detector sensitivity and combinations thereof to optimize detection and classification of the object in response to a signal indicative thereof.

13. The system of claim 3, wherein the first and at least one second metal detectors operate in a time-domain mode and are alternately energized.

14. The system of claim 3, further comprising a plurality of drums rotatably supporting the closed-loop belt and defining therebetween the forward and return stretches of the closed-loop belt, and a commutation system mounted in at least one of the drums and operative to transmit power from the power source to the first and at least one second detectors.

15. The system of claim 14, further comprising an alarm system coupled to the first and at least one second metal detectors through the commutation system and operative to generate a signal indicative of the detection of the object.

16. The system of claim 3, wherein the transmitter of the first metal detector is tuned to a frequency different from a frequency to which the transmitter of the at least one second metal detector is tuned to minimize crosstalk between the first and at least one second metal detectors.

17. The system of claim 1, wherein the closed-loop belt is formed from a continuous flexible material or is formed with a plurality of spaced apart links.

18. The system of claim 1, wherein the transmitter and receiver constitute a metal detector selected from the group consisting of magneto-resistors, flux gate, and a loop antenna, and wherein the loop antenna includes a single coil acting both as the transmitter and the receiver or separate first and second coils acting as the transmitter and receiver, respectively.

19. The system of claim 1, wherein the transmitter is an acoustic transmitter generating an acoustic field capable of exciting a medium, which surrounds the object generating a set of vibrations in response to the generated acoustic field, the receiver being a laser Doppler system configured to measure the set of vibrations of the medium and to differentiate between the vibrations of the medium and the vibrations of the object.

20. A method for detecting a metal object comprising:
    displacing a closed-loop belt in proximity to the object; and,
    displacing a first metal detector with the belt, the first metal detector comprising:
        a transmitter, embedded in the closed-loop belt to move therewith, generating a time-varying magnetic field inductively coupling the transmitter and the metal object; and
        a receiver, embedded in the closed-loop belt to move therewith, measuring eddy currents induced in the metal object by the time-varying magnetic field.

21. The method of claim 20, further comprising the step of embedding a plurality of additional receivers in the closed-loop belt and selectively energizing the receivers to minimize interference therebetween.

22. The method of claim 21, further comprising the steps of:
- analyzing responses from the plurality of additional receivers; and
- determining a depth at which the metal object is buried based on the analyzed responses.

23. The method of claim 20, further comprising the steps of:
- positioning the closed-loop belt adjacent to a conveyor transporting material to be separated from the object; and,
- synchronizing a speed of advancement of the closed-loop belt and the conveyor to increase a dwell time during which the object is within a field of view of the receiver.

24. The method of claim 20, further comprising the step of mounting the closed loop belt to a vehicle.

25. The method of claim 20, further comprising the step of embedding at least one battery in the closed-loop conveyor to actuate the receiver.

26. The method of claim 20, wherein the step of generating the field includes the step of generating an acoustic field, thereby exciting a medium, which surrounds the object.

27. The method of claim 26, further comprising the steps of:
- generating a set of vibrations by the object in response to the generated acoustic field;
- measuring vibrations of the medium; and,
- differentiating the vibrations of the medium over the vibrations of the object, thereby classifying the object.

* * * * *